(12) United States Patent
Jongsma et al.

(10) Patent No.: US 8,126,407 B2
(45) Date of Patent: Feb. 28, 2012

(54) TRANSMITTER CIRCUIT

(75) Inventors: Jakob Jongsma, Graz (AT); Vjekoslav Matic, Stattegg (AT)

(73) Assignee: Infineon Technologies AG, Neubiberg (DE)

( * ) Notice: Subject to any disclaimer, the term of this patent is extended or adjusted under 35 U.S.C. 154(b) by 924 days.

(21) Appl. No.: 12/032,296

(22) Filed: Feb. 15, 2008

(65) Prior Publication Data

US 2008/0200134 A1 Aug. 21, 2008

(30) Foreign Application Priority Data

Feb. 15, 2007 (DE) .......................... 10 2007 007 579

(51) Int. Cl.
*H01Q 11/12* (2006.01)
*H04B 1/04* (2006.01)
(52) U.S. Cl. ........ 455/91; 455/121; 455/127.1; 455/129
(58) Field of Classification Search .......... 455/120–123, 455/127.1, 129, 575.7, 91
See application file for complete search history.

(56) References Cited

U.S. PATENT DOCUMENTS

| 4,380,767 | A | * | 4/1983 | Goldstein et al. | ............ 343/745 |
| 5,263,183 | A | * | 11/1993 | Owen | ........................ 455/193.1 |
| 5,491,715 | A | * | 2/1996 | Flaxl | ............................ 375/344 |
| 5,589,844 | A | * | 12/1996 | Belcher et al. | ................ 343/860 |
| 6,526,263 | B1 | * | 2/2003 | Saito | ................................ 455/78 |
| 6,907,234 | B2 | * | 6/2005 | Karr et al. | ................... 455/193.1 |
| 7,107,026 | B2 | | 9/2006 | Pinks | |
| 7,176,845 | B2 | * | 2/2007 | Fabrega-Sanchez et al. | . . 343/861 |
| 7,385,399 | B2 | * | 6/2008 | Deimling et al. | ............. 324/318 |
| 2002/0149535 | A1 | * | 10/2002 | Toncich | ......................... 343/860 |
| 2005/0003771 | A1 | | 1/2005 | De Ruijter et al. | |
| 2007/0232248 | A1 | * | 10/2007 | Kasha et al. | ................... 455/121 |

FOREIGN PATENT DOCUMENTS

| DE | 1282737 | 11/1968 |
| DE | 10353613 A1 | 6/2005 |

OTHER PUBLICATIONS

S. Hung-Lung Tu et al., "Low-Distortion CMOS Complementary Class E RF Tuned Power Amplifiers", IEEE Transactions on Circuits and Systems-I: Fundamental Theory and Applications, vol. 47, No. 5, May 2000 (pp. 774-779).
"Design of Highly-Efficient Power-Controllable CMOS Class E RF Power Amplifiers", Steve Hung-Lung Tu, et al., Imperial College of Science, Technology, and Medicine, London, 1999 IEEE.

* cited by examiner

*Primary Examiner* — Simon Nguyen
(74) *Attorney, Agent, or Firm* — Dicke, Billig & Czaja, PLLC

(57) ABSTRACT

A transmitter circuit. One embodiment provides for emitting electromagnetic waves. The circuit has a transmitting device for outputting a transmission signal, an antenna device for emitting the transmission signal in the form of an electromagnetic wave, and a matching device which is electrically connected to the transmitting device and to the antenna device. The matching device includes at least two tuning elements for setting the resonant frequency of a circuit arrangement, formed from the antenna device and the first and second tuning elements, and for matching the impedance of the transmitting device and the antenna device.

23 Claims, 2 Drawing Sheets

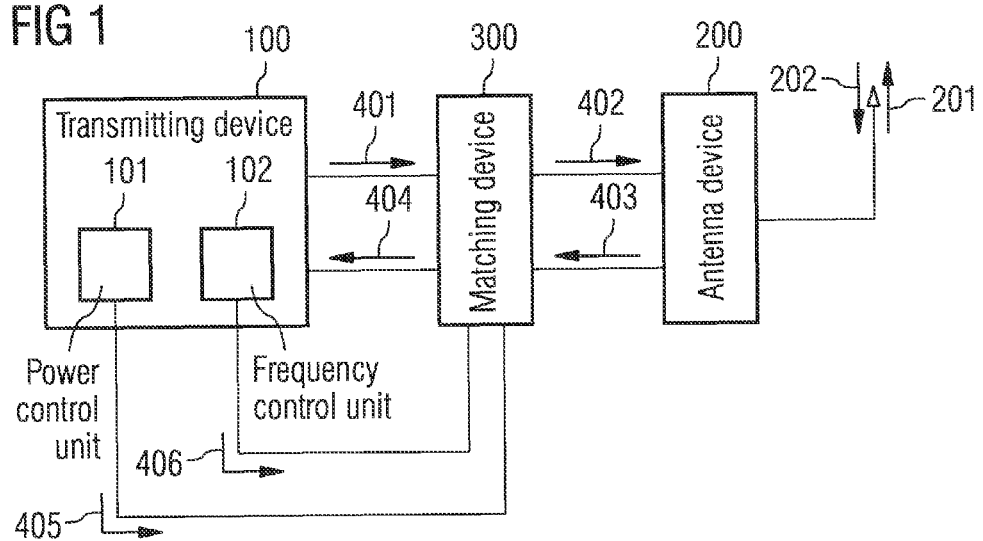
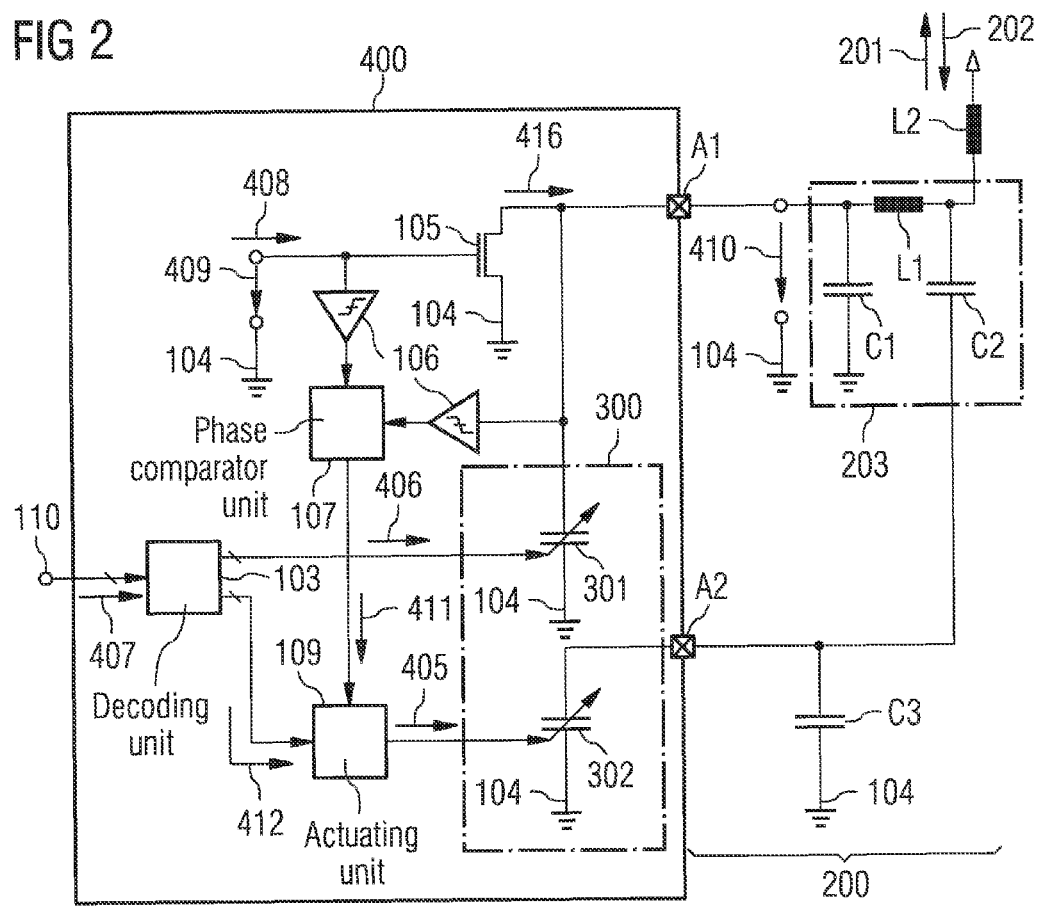

TRANSMITTER CIRCUIT

CROSS-REFERENCE TO RELATED APPLICATIONS

This Utility Patent Application claims priority to German Patent Application No. DE 10 2007 007 579.2 filed on Feb. 15, 2007, which is incorporated herein by reference.

BACKGROUND

The present invention relates, in general, to transmitter circuits and relates in one embodiment, to a transmitter circuit which is connected to at least one antenna device for emitting electromagnetic waves.

Such transmitter circuits have numerous uses, for example in the unlicensed frequency band which is referred to as the industrial/scientific/medical (ISM) band. Examples of these are industrial remote control systems, telemetry and low-power data transmission. Typical transmission frequencies cover a range of 300 MHz to 1 GHz, in which case European ISM standards have an operating frequency of 433 MHz. A typical transceiver circuit for the ISM band should be able to be operated at different carrier frequencies.

Further examples of the use of ISM transmitter circuits include security alarms, telemetry, environment monitoring systems, wireless data converters, access and movement monitoring systems, remote measuring systems, bar code readers, wireless keyboards, wireless computer mice, radio-controlled locking systems, tire pressure monitoring systems, garage door opening devices and doorbells. Many of these uses are based on unidirectional data transmissions from a transmitter to a receiver, while certain uses are based on bidirectional data transmissions using at least two transceivers.

For these and other reasons, there is a need for the present invention.

BRIEF DESCRIPTION OF THE DRAWINGS

The accompanying drawings are included to provide a further understanding of embodiments and are incorporated in and constitute a part of this specification. The drawings illustrate embodiments and together with the description serve to explain principles of embodiments. Other embodiments and many of the intended advantages of embodiments will be readily appreciated as they become better understood by reference to the following detailed description. The elements of the drawings are not necessarily to scale relative to each other. Like reference numerals designate corresponding similar parts.

FIG. 1 illustrates a block diagram of a transmitter circuit for transmitting and receiving electromagnetic waves in accordance with one embodiment.

FIG. 2 illustrates, in greater detail, a block diagram of a transmitter circuit which is intended to emit electromagnetic waves and has a matching device and an antenna device in accordance with one embodiment.

DETAILED DESCRIPTION

Figure 3:
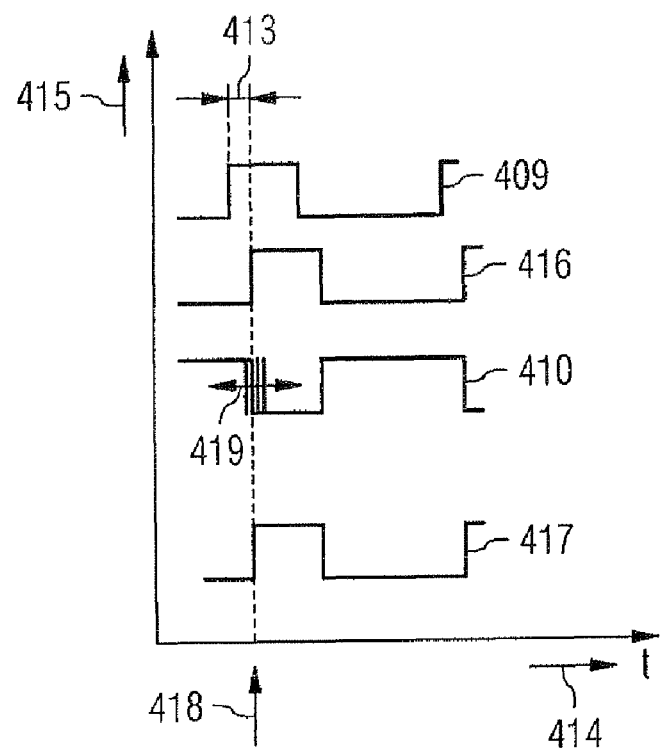
FIG. 3 illustrates a graph which illustrates a signal timing diagram of the fundamental signals which are processed in a phase comparator unit of the transmitter circuit in order to provide a phase comparator signal.

In the following Detailed Description, reference is made to the accompanying drawings, which form a part hereof, and in which is shown by way of illustration specific embodiments in which the invention may be practiced. In this regard, directional terminology, such as "top," "bottom," "front," "back," "leading," "trailing," etc., is used with reference to the orientation of the Figure(s) being described. Because components of embodiments can be positioned in a number of different orientations, the directional terminology is used for purposes of illustration and is in no way limiting. It is to be understood that other embodiments may be utilized and structural or logical changes may be made without departing from the scope of the present invention. The following detailed description, therefore, is not to be taken in a limiting sense, and the scope of the present invention is defined by the appended claims.

It is to be understood that the features of the various exemplary embodiments described herein may be combined with each other, unless specifically noted otherwise.

One or more embodiments provide transmitter circuits which allow good matching to the antennas used.

One or more embodiments provide a matching device, which is connected between a transmitting device and an antenna device, with at least two tuning elements for setting a resonant frequency and for matching an impedance of the transmitting device to an impedance of the antenna device.

Setting at least two tuning elements makes it possible to mutually adjust a resonant frequency and impedance matching.

In one embodiment, the transmitter circuit for emitting electromagnetic waves substantially has:

a) a transmitting device for outputting a transmission signal;

b) an antenna device for emitting the transmission signal in the form of an electromagnetic wave; and c) a matching device having at least two tuning elements for setting the resonant frequency of a circuit arrangement, which is formed from the antenna device and the first and second tuning elements, and for matching the impedance of the transmitting device and the antenna device.

Another embodiment provides an integrated circuit arrangement for driving an antenna device, the circuit arrangement substantially having:

a) a transmitting device for providing a transmission signal which can be emitted in the form of the electromagnetic wave using the antenna device;

b) first and second connections for connecting the antenna device and for outputting the transmission signal; and c) a matching device having at least two tuning elements which can be set independently of one another, a first tuning element being designed to set an impedance between the first connection and a ground potential, and a second tuning element being designed to set an impedance between the second connection and the ground potential.

The transmission frequency of the transmitter circuit can thus be varied without causing an impedance mismatch. It is also possible, when a transmission frequency of the transmitter circuit is kept constant, to vary impedance matching in such a manner that a transmission power of the transmitter circuit can be modified.

One advantage of the circuit arrangement is that a load impedance can thus be changed without additional changeover components.

Furthermore, one embodiment of a method for emitting an electromagnetic wave substantially has the following process:

a) a transmission signal is output from a transmitting device; and b) the transmission signal is emitted in the form of the electromagnetic wave using an antenna device, and c) the transmitting device is matched to the antenna device using a matching device, the matching device having at least two tuning elements for setting the resonant frequency of a circuit arrangement, which is formed from the antenna device and the first and second tuning elements, and for matching the impedance of the transmitting device and the antenna device.

FIG. 1 illustrates a block diagram of one embodiment. A reference symbol 100 denotes a transmitting device, a reference symbol 200 denotes an antenna device, and a reference symbol 300 denotes a matching device which is connected between the transmitting device and the antenna device. According to the overview block diagram of FIG. 1, the transmitting device contains two fundamental blocks, that is to say a power control unit 101 for controlling the power of an output signal and a frequency control unit 102 for controlling a frequency of the output signal or of the electromagnetic wave to be transmitted.

The frequency control unit 102 hereby interacts with the matching device 300 to determine the resonant frequency of the transmitter section of the transmitting device 100.

A transmission signal 401, which is supplied to the matching device 300, is output from the transmitting device 100. The matching device is used, for example, to match the impedance, with the result that a matched transmission signal 402 can be supplied, from the matching device, to the antenna device 200 which emits the matched transmission signal 402 in the form of an electromagnetic wave 201 into free space (free-space radiation).

The antenna device can be used to receive an electromagnetic wave 202 which is supplied to the matching device 300 as a received signal 403. The matching device 300 converts the received signal 403 into a matched received signal 404 and supplies it to the transmitting device 100.

A fundamental embodiment is that the transmitting device 100 uses two control signals, that is to say a power control signal 405 which is output from the power control unit 101 and a frequency control signal 406 which is output from the frequency control unit 102, to act on the matching device 300. The interaction between the transmitting device 100 and the matching device 300 will be described in detail below with reference to FIGS. 2 to 4.

The matching device 300 maintains a load impedance, which is seen from a power amplifier in the transmitting device 100, at resonance, that is to say it attempts to minimize the reactive component of the load impedance. This makes it possible to avoid manufacturing tolerances and external influences.

In the case of a remote-controlled lock, for example, the external influences may stem from a person operating the remote control. They may also stem, for example, from the edge of a tire when the transmitter circuit is used in a tire pressure monitoring system.

It is also possible to preset the circuit according to a required load impedance level, thus making it possible to define the emitted output power.

FIG. 2 illustrates a control circuit 400 for setting the matching device 300 in more detail. Circuit components which form the fundamental components of the antenna device 200 are connected to the control circuit 400 by using two output connections A1, A2.

The matching device has at least two tuning elements 301, 302 for setting the resonant frequency of a circuit arrangement, which is formed from the antenna device 200 and the first and second tuning elements 301, 302, and for matching the impedance of the transmitting device and the antenna device 200.

In this embodiment, the first tuning element 301 is used to set an impedance between the first connection unit A1 and a ground potential 104, while the second tuning element 302 is designed to set an impedance between the second connection unit A2 and the ground potential 104.

The setting of the first tuning element 301, which acts on the impedance between the first connection unit A1 and the ground potential 104, substantially determines the resonant frequency of the circuit arrangement which is formed from an amplifier unit 105, the antenna device 200 and the first and second tuning elements 301, 302, while the setting of the second tuning element 302, which acts on the impedance between the second connection unit A1 and the ground potential 104, substantially defines the impedance matching between the control device 400 and the antenna device 200.

The antenna device is in the form of a pi filter unit 203 which includes an inductive element L1 and two capacitive elements C1, C2. The inductive element L1 is connected in series with a second inductive element L2, which act individually or in combination as an antenna or loop antenna.

The first capacitive element C1 is connected between the connecting connection of the output connection A1 of the control circuit 400 and a first connection of the inductive element L1 and ground 104, while the second capacitive element C2 is connected between the output connection A2 of the control device 400 and the connecting connection of the inductive elements L1 and L2.

In order to set the resonant frequency and/or the impedance of the antenna device, the capacitances C1 and C2 are changed according to the method. For this purpose, a first tuning element 301 is connected in parallel with the first capacitance C1 inside the control circuit 400, while a second tuning element 302 is connected in series with the second capacitance C2 and in parallel with a capacitance C3 which is arranged outside the control circuit 400. The resonant frequency and impedance are set using the first and second tuning elements 301 and 302.

In order to set the impedance, it is necessary to minimize a phase shift between the output current and the output voltage of a power amplifier, which is arranged in the control circuit 400, in order to keep a reactive component in the load impedance low. The control circuit 400 has the amplifier unit 105 which is supplied with an amplifier input current 408 from further circuit components (not illustrated). An amplifier output current 416 which is output from the amplifier unit 105 flows into the antenna device. In this case, a potential difference between the output connection A1 of the control circuit 400 and ground 104 is stated as an amplifier output voltage 410.

A phase shift between the amplifier output voltage 410 and the amplifier output current 416 is used as a control signal for the first and second tuning elements 301, 302 in order to set an impedance in a predefinable manner. The amplifier input voltage 409 which is applied between the input connection of the amplifier unit 105 and the ground potential 104 is used in this case as a phase reference for the amplifier output current 416, that is to say it is possible to determine the amplifier output current 416 by detecting the amplifier input voltage 409. Only a phase comparison of the amplifier input voltage 409 and the amplifier output voltage 410 thus needs to be carried out in order to determine a phase shift between the amplifier output voltage 410 and the amplifier output current 416. For this purpose, a phase comparator unit 107 is provided in the control circuit 400, which phase comparator unit compares the phases of the amplifier input voltage 409 and of the amplifier output voltage 410 with one another.

The phase comparator unit 107 is coupled to the input connection of the amplifier unit 105 and to the output connection of the amplifier unit 105 by using respective limiter units 106. The method of operation of the phase comparator unit 107 will be described in detail below with reference to FIG. 4.

The control circuit 400 also has a decoding unit which decodes an external control signal 407 which can be externally predefined using a control input 110. The control signal which can be externally predefined determines a power level of the amplifier unit 105, for example. The decoding unit 103 is thus used to initialize an actuating unit 109 using an output initialization signal 412 in such a manner that the actuating unit 109 sets the second tuning element 302 to an initial value. A phase comparator signal 411 is also supplied to the actuating element 109.

The phase comparator signal 411 is output from the phase comparator unit 107 of the matching device 300 and is used to determine a phase shift 419 (see below with reference to FIG. 3) between the amplifier output voltage 410 and the amplifier output current 416 of the amplifier unit 105.

The frequency control signal 406, which is used to drive the first tuning element 301, is also output from the decoding unit 103. The first tuning element 301 is thus used to determine the resonant frequency of the circuit arrangement, while impedance matching is made possible by combining the settings of the two tuning elements, that is to say the setting of the first tuning element 301 using the frequency control signal 406 and the setting of the second tuning element 302 using the power control signal 405 which is output from the actuating unit 409.

In one embodiment, it is expediently possible to use the matching device 300 to drive the two tuning elements 301, 302 in such a manner that setting of a resonant frequency of the transmitting device 100 and matching of an impedance of the transmitting device 100 to an impedance of the antenna device 200 are mutually carried out.

The loop antenna which is in the form of an inductive element L1 has a very high parallel impedance, with the result that matching of an impedance of several hundred ohms, which is required by the amplifier unit 105, to an antenna impedance of several kilohms must be provided. The inductance L1 of the antenna is usually predefined by the physical or geometrical restriction during use, as a result of which only the components C1 and C2 can be freely set. In this case, the capacitive element C1 mainly influences the resonant frequency of the arrangement, while the capacitive element C2 both determines the resonant frequency and, together with the inductive element L1, provides impedance transformation. Since large voltage amplitudes prevail at the capacitive element C2, provision is made of a series capacitor C3 (in series with C2) which is used to lower the voltage amplitudes applied to the capacitive element C2 using capacitive division.

FIG. 3 illustrates a timing diagram for explaining the method of operation of the phase comparator unit 107. The amplitude 415 of different voltage profiles is plotted as a function of time 414. The amplifier input voltage 409 has a fixed amplifier phase shift 413 with respect to the amplifier output current 416. The amplifier output voltage 410 is also illustrated in a tuned state in FIG. 3. Phase shifts which are indicated by a reference symbol 419 may occur between the amplifier output voltage 410 and the amplifier output current 416. A clock signal 417 which defines sampling times 418 and is used as a time reference is also illustrated.

Figure 4:
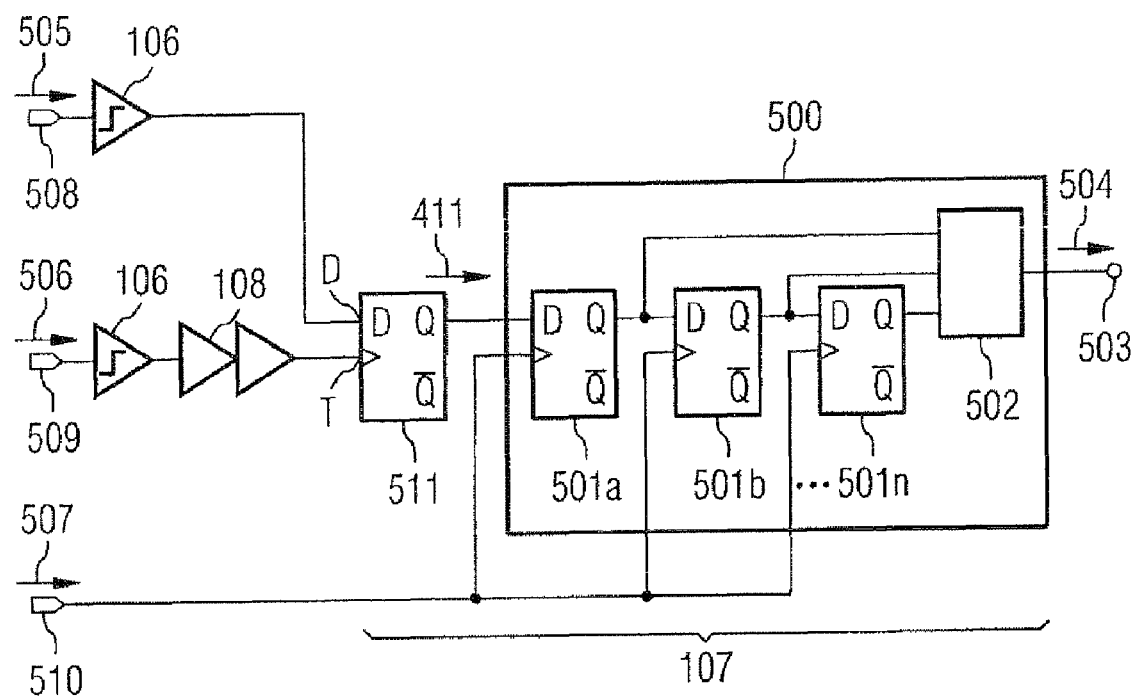
FIG. 4 illustrates a block diagram of a circuit arrangement for generating and further processing the phase comparator signal in accordance with one embodiment.

FIG. 4 illustrates one embodiment for designing the phase comparator unit 407. An output voltage signal 505 which corresponds to the amplifier output voltage 410 of the amplifier unit 105 is supplied via an output voltage connection 508, an input voltage signal 506 which corresponds to the amplifier output current 416 of the amplifier unit 105, as explained above, is supplied via an input voltage connection 509, and a tuning clock signal 507 which is at a low frequency in comparison with the clock signal 417 is supplied via a clock signal connection 510.

In the embodiment illustrated in FIG. 4, the phase comparator unit 107 is designed to determine a phase shift 419 between an amplifier output voltage 410 and an amplifier output current 416 and to output a phase comparator signal 411 which depends on the phase shift 419. The phase comparator unit is in the form of a D-type flip-flop. In order to delay the input voltage signal 506 according to the amplifier phase shift 413 (FIG. 3), a delay unit 108 is connected between the input voltage connection 509 and an input connection of a D-type flip-flop 511. As illustrated in FIG. 4, the input voltage signal 506 is supplied to the clock input T of the D-type flip-flop 511, while the output voltage signal 505 is supplied to the D input D of the D-type flip-flop 511.

This results in the following states at the Q output of the D-type flip-flop 511. If the phase of the output voltage signal 505 leads that of the input voltage signal 506, the Q output of the D-type flip-flop is at a logic "1" level, while, when the output voltage signal 505 lags the input voltage signal 506, the Q output of the D-type flip-flop 511 always has a "logic 0".

The phase comparator signal 411 obtained by using the processing in the D-type flip-flop 511 is then also supplied to a signal processing device 500 which has three D-type flip-flops as level detection units 501*a*-501*n*. It should be pointed out that more than two level detection units must be provided but the invention is not restricted to the three level detection units illustrated in this case.

The tuning clock signal 507 is at a low frequency in comparison with the clock signal 417. The tuning clock signal 507 is supplied to the D-type flip-flops 501*a*-501*n* as the clock signal, which tuning clock signal ensures that the phase comparator signal 411 is debounced or filtered. For this purpose, the determining unit 502 makes a "majority decision" with regard to the Q outputs of the individual level detection units 501*a*-501*n* and outputs a tuning signal 504 by using a connection unit 503. The actuating unit 109 (see FIG. 2) which may be in the form of an up/down-counter is now set on the basis of the tuning signal 504 in such a manner that it outputs the power control signal 405 for driving the second tuning element 302.

Although the present invention was described above using exemplary embodiments, it is not restricted to the latter but rather may be multifariously modified.

The invention is not restricted to the possible uses either.

Although specific embodiments have been illustrated and described herein, it will be appreciated by those of ordinary skill in the art that a variety of alternate and/or equivalent implementations may be substituted for the specific embodiments shown and described without departing from the scope of the present invention. This application is intended to cover any adaptations or variations of the specific embodiments discussed herein. Therefore, it is intended that this invention be limited only by the claims and the equivalents thereof.

What is claimed is:

1. A transmitter circuit for emitting electromagnetic waves, comprising:
   a transmitting device for outputting a transmission signal, the transmitting device comprising an amplifier unit configured for amplifying an amplifier input voltage;
   an antenna device for emitting the transmission signal in the form of an electromagnetic wave;
   a matching device having at least two tuning elements for setting the resonant frequency of a circuit arrangement, which is formed from the antenna device and the first and second tuning elements, and for matching the impedance of the transmitting device and the antenna device; and
   a phase comparator unit for determining a phase shift between an amplifier output voltage and an amplifier output current of the amplifier unit and for outputting a phase comparator signal which depends on the phase shift and is used as a control signal for the tuning elements,
   wherein the amplifier output current is determined by detecting the amplifier input voltage.

2. The transmitter circuit of claim 1, wherein the antenna device has a pi filter unit which comprises an inductive element and two capacitive elements.

3. The transmitter circuit of claim 1, wherein the transmitting device has a power control unit for providing a power control signal which is used to control an output power of the electromagnetic wave, which power is output from the antenna device.

4. The transmitter circuit of claim 1, wherein the transmitting device has a frequency control unit for providing a frequency control signal which is used to control an output frequency of the electromagnetic wave, which frequency is output from the antenna device.

5. The transmitter circuit of claim 4, comprising the transmitting device including a decoding unit for decoding an external control signal and for outputting the frequency control signal.

6. The transmitter circuit of claim 1, wherein the phase comparator unit is in the form of a D-type flip-flop.

7. The transmitter circuit of claim 6, wherein the phase comparator unit also has a signal processing device for processing the phase comparator signal, which is output from the D-type flip-flop, on the basis of a tuning clock signal.

8. The transmitter circuit of claim 1, wherein the matching device has an actuating unit for setting at least one tuning element on the basis of the phase comparator signal.

9. The transmitter circuit of claim 8, wherein the decoding unit is arranged in the transmitting device being designed to initialize the actuating unit using an initialization signal in such a manner that the actuating unit sets the at least one tuning element to an initial value.

10. An integrated circuit arrangement configured for driving an antenna device, comprising:
    a transmitting device for providing a transmission signal which is emitted in the form of the electromagnetic wave using the antenna device, the transmitting device comprising an amplifier unit configured for amplifying an amplifier input voltage, wherein an amplifier output current is determined by detecting the amplifier input voltage;
    first and second connections for connecting the antenna device and for outputting the transmission signal; and
    a matching device having at least two tuning elements which are set independently of one another, a first tuning element being designed to set an impedance between the first connection and a ground potential, and a second tuning element being designed to set an impedance between the second connection and the ground potential.

11. The integrated circuit arrangement of claim 10, wherein the antenna device has a pi filter unit which comprises an inductive element and two capacitive elements.

12. The integrated circuit arrangement of claim 10, wherein the transmitting device has a power control unit for providing a power control signal which is used to control an output power of the electromagnetic wave, which power is output from the antenna device.

13. The integrated circuit arrangement of claim 10, wherein the transmitting device has a frequency control unit for providing a frequency control signal which is used to control an output frequency of the electromagnetic wave, which frequency is output from the antenna device.

14. The integrated circuit arrangement of claim 13, wherein the transmitting device has a decoding unit for decoding an external control signal and for outputting the frequency control signal.

15. The integrated circuit arrangement of claim 10, wherein the matching device has a phase comparator unit for determining a phase shift between an amplifier output voltage and an amplifier output current and for outputting a phase comparator signal which depends on the phase shift.

16. The integrated circuit arrangement of claim 15, wherein the phase comparator unit is in the form of a D-type flip-flop.

17. The integrated circuit arrangement of claim 16, wherein the phase comparator unit also has a signal processing device for processing the phase comparator signal, which is output from the D-type flip-flop, on the basis of a tuning clock signal.

18. The integrated circuit arrangement of claim 15, wherein the matching device has an actuating unit for setting at least one tuning element on the basis of the phase comparator signal.

19. The integrated circuit arrangement of claim 18, wherein the decoding unit is arranged in the transmitting device being designed to initialize the actuating unit using an initialization signal in such a manner that the actuating unit sets the at least one tuning element to an initial value.

20. A method for emitting an electromagnetic wave, comprising:
    outputting a transmission signal from a transmitting device;
    emitting the transmission signal in the form of the electromagnetic wave using an antenna device;
    matching the transmitting device to the antenna device using a matching device, the matching device having at least two tuning elements for setting the resonant frequency of a circuit arrangement, which is formed from the antenna device and the first and second tuning elements, and for matching the impedance of the transmitting device and the antenna device; and
    determining a phase shift between an amplifier output voltage and an amplifier output current using a phase comparator unit arranged in the matching device, and a phase comparator signal which depends on the phase shift being output,
    wherein the amplifier output current is determined by detecting an amplifier input voltage.

21. The method of claim 20, comprising setting the at least one tuning element on the basis of the phase comparator signal using an actuating unit which is arranged in the matching device.

22. The method of claim 21, comprising the actuating unit setting the at least one tuning element to an initial value on the basis of an initialization signal generated by a decoding unit arranged in the transmitting device.

23. The method of claim 20, comprising processing the phase comparator signal on the basis of a tuning clock signal using a signal processing device arranged in the phase comparator unit.

* * * * *